UNITED STATES PATENT OFFICE.

ELISHA CROWELL, OF NEW YORK, N. Y.

IMPROVED ARTICLE OF PREPARED COD-FISH.

Specification forming part of Letters Patent No. 84,801, dated December 8, 1868.

*To all whom it may concern:*

Be it known that I, ELISHA CROWELL, of the city, county, and State of New York, have invented a new and useful Improvement in Preparing Cod-Fish; and I do hereby declare that the following is a full, clear, and exact description of the same.

The object of this invention is so to prepare cod and other fish that it shall be divested of everything not edible, which unnecessarily adds to its weight and bulk, and shall be reduced to the most convenient form for handling and transportation, while at the same time it is sufficiently protected from the action of the air.

The usual method of preparing such fish heretofore employed consists simply in salting and drying the fish in large pieces, each piece being generally one-half or the whole of a fish. In this condition it cannot be conveniently packed in small boxes, and is therefore exposed to atmospheric influences, which injure its quality and taste.

From the same cause it is not in a convenient condition for transportation or handling, and the refuse portions add unnecessarily to its weight, while also deteriorating the quality of the article, as an article of sale and common use.

To obviate these disadvantages one manufacturer has ground up the fish; but when treated thus the air reaches directly every fiber of the fish, and soon destroys its taste, besides drying it up to such a degree that it becomes hard and "stringy," and after a time almost unfit for use. It can also be easily adulterated, either with foreign substances, or with the ground skin or bones, or fish improperly cured. In order to overcome all these disadvantages and produce an article which shall possess and retain all the delicate flavor of the cod-fish, while entirely clear of useless matter, and in the most convenient possible condition for transportation, I remove the bones and skin, either before or after salting, and then cut up the fish into long narrow strips.

These strips I expose to the drying action of a current of air, either naturally or artificially induced, so as to remove the moisture from the fish sufficiently for its preservation.

The fish may be cut up or stripped still more between one drying operation and the next. Salt is not usually applied during the operation.

The strips thus produced are then cut into suitable lengths and packed into boxes, kegs, or barrels, to exclude atmospheric influences as far as possible. The retailer can pack the article into small boxes, containing half a pound or a pound, &c., for the convenience of himself and his customers.

I do not claim the putting up of cod-fish in packages for domestic use; but,

Having thus described my invention, what I claim as new, and desire to secure by Letters Patent, is—

A new article of prepared cod-fish, made substantially as described.

The above specification of my invention signed by me this 21st day of November, 1868.

ELISHA CROWELL.

Witnesses:
 FRANK BLOCKLEY,
 C. L. TOPLIFF.